Oct. 6, 1942.  R. W. DINZL  2,298,043
MOLDING MACHINE
Filed July 30, 1940  2 Sheets-Sheet 1
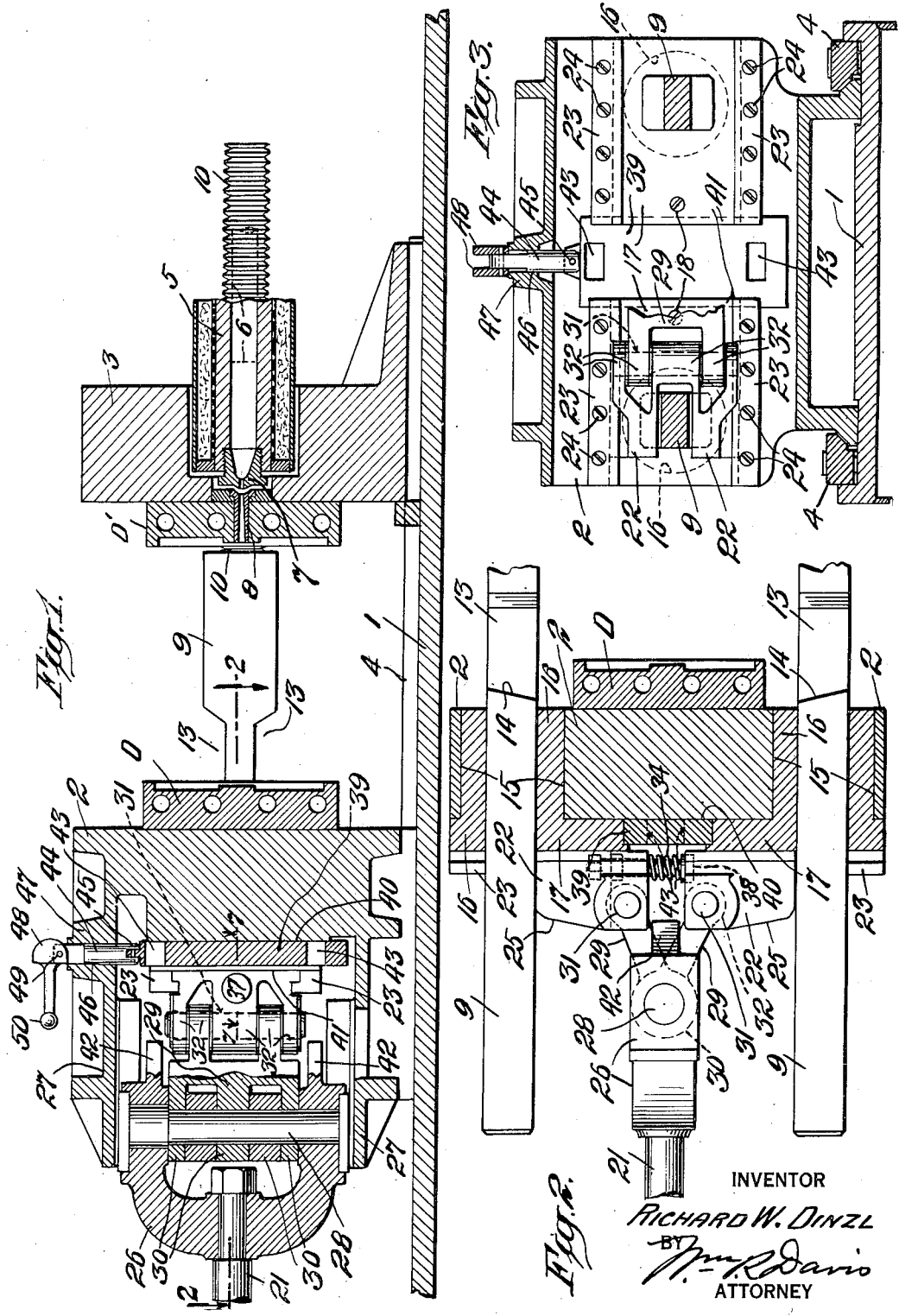
INVENTOR
RICHARD W. DINZL
BY
ATTORNEY Oct. 6, 1942.    R. W. DINZL    2,298,043
MOLDING MACHINE
Filed July 30, 1940    2 Sheets-Sheet 2
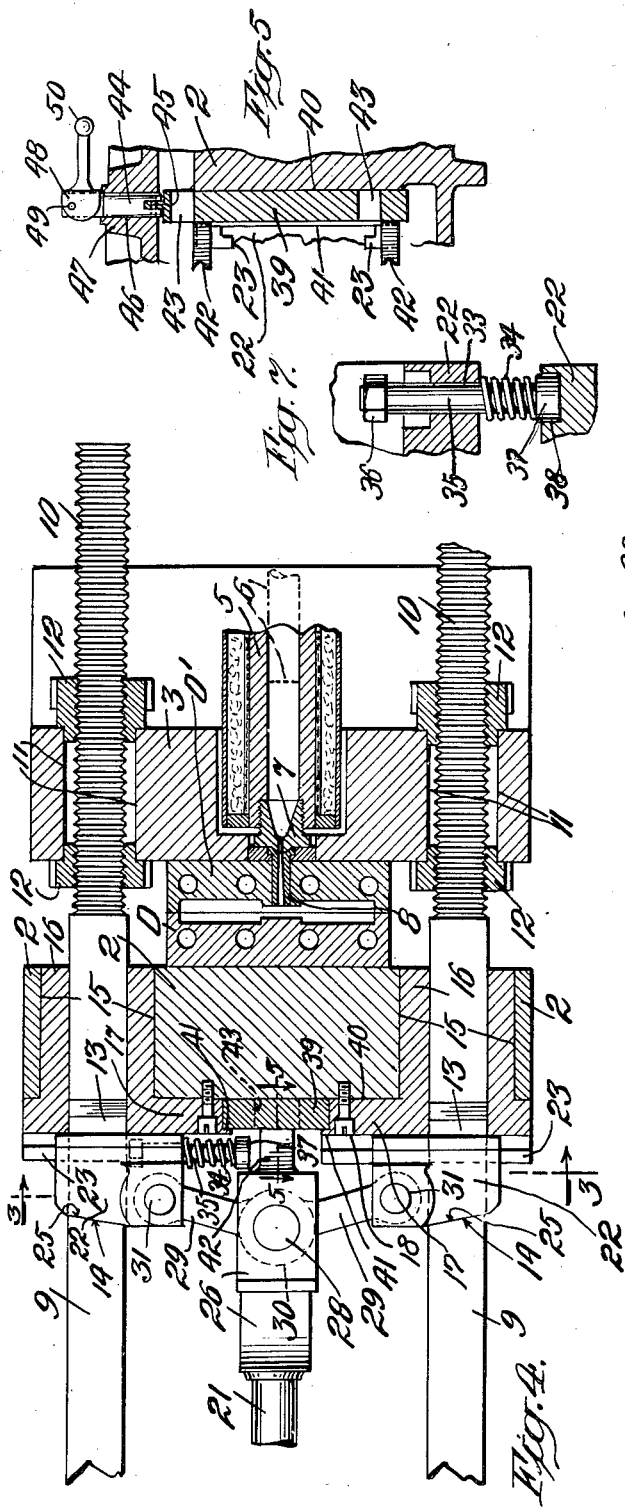
INVENTOR
RICHARD W. DINZL
BY
J. R. Davis
ATTORNEY Patented Oct. 6, 1942

2,298,043

UNITED STATES PATENT OFFICE 2,298,043

MOLDING MACHINE

Richard W. Dinzl, Westfield, N. J., assignor to The Watson-Stillman Co., Roselle, N. J., a corporation of New Jersey Application July 30, 1940, Serial No. 348,343

5 Claims. (Cl. 18—16)

This invention relates more particularly to improvements in molding machines of a type disclosed in a copending patent application of Edward R. Knowles, Serial No. 204,122, filed April 20, 1938, and wherein force for closing and locking a mold is transmitted through a toggle mechanism.

An important object of the invention is to provide such a machine with a satisfactory gauge device designed to facilitate accurate adjustment of the machine for proper operation.

Other objects of the invention will appear hereinafter.

In the drawings,

Fig. 1 is a vertical longitudinal sectional view of a portion of an injection molding machine;

Fig. 2 is a horizontal section approximately on the line 2—2 of Fig. 1;

Fig. 3 is a vertical cross section approximately on the line 3—3 of Fig. 4 with parts broken away;

Fig. 4 is a view similar to Fig. 3 with the parts in mold-closing relation;

Fig. 5 is a detail vertical section on the line 5—5 of Fig. 4;

Fig. 6 is a sectional side elevation of the molding machine upon a reduced scale; and Fig. 7 is a detail section on the line 7—7 of Fig. 1.

The molding machine shown includes a base 1 upon which two platens 2 and 3 are mounted in opposed relation. Platen 2 is mounted between guides 4 for reciprocation toward and from platen 3 to close and open a mold. Mold sections or dies D and D' form the mold and are detachably mounted upon the platens 2 and 3 respectively. A heating cylinder 5 for thermo-plastic material is supported by means not shown, in association with platen 3 and has an injection plunger 6, indicated by dotted lines. At its forward end said cylinder has an injection nozzle 7 disposed to discharge into a mold-charging port or gate 8 in the die D'.

Platen 3 is mounted for limited reciprocation only sufficient to make and break contact between the mold gate 8 and the injection nozzle 7. Said platen bears a pair of resistance rods 9 arranged at opposite sides of the die D' in parallel relation along the line of reciprocation of the shiftable platen 2. The resistance rods have screw-threaded shanks 10 extending through bores 11 in the platen 3. Nuts 12 are screwed upon said shanks to abut the opposite faces of platen 2 and secure the rods thereto for longitudinal adjustment. Said nuts have bushing projections at their inner faces to fit rotatably in the bores 11. The body of each rod, at the left of platen 2 with reference to Figs. 1, 2 and 4, is approximately rectangular in cross section. At an intermediate point in its length the rod body is cut away or recessed at its upper and lower sides, as at 13, to provide it with shoulders 14 facing toward the platen 3 and sloping horizontally with reference to the length of the rod. Said shoulders of the two rods slope in opposite directions and form keeper abutments for locking means to be described hereinafter. The platen 2 has parallel bores 15 in which are fitted bushings 16. These bushings have rectangular passages to slidably fit the resistance rods 9 and also have flat flanges 17 bearing against the outer face of platen 2 and fastened thereto by screws, as at 18.

Platen 2 is advanced, locked, unlocked and retracted by hydraulic pressure operated mechanism. This mechanism includes a horizontal cylinder 19 mounted upon the base in line with the center line of the platens and provided at its opposite ends with hydraulic pressure connections 20. A ram 21 is reciprocable within the cylinder and extends from the right-hand end thereof. Mounted upon the outer face of the bushing flanges 17 are two locking wedges or bolts 22. Guides 23, secured by screws 24 to said flanges, support the wedges thereto for reciprocation transversely of the resistance rods 9. The wedges are diametrically arranged with respect to the axis of the ram 21 and each is formed with a pair of wedge faces 25 having a slope corresponding to that of the shoulders 14 of the adjacent resistance rod. The wedges are formed to straddle the reduced portions of the rods, between the recesses 13, in order to engage the wedge faces 25 with the rod shoulders 14, as will be explained hereinafter.

A yoke 26 is secured to the forward end of the ram 21 and is supported and guided for reciprocation with the ram by guide extensions 27 upon the platen. A toggle operatively connects said yoke to the wedges 22. The legs of said yoke bear a wrist pin 28. A pair of toggle links 29 have at one end knuckles 30 pivoted upon said pin. The wedges also bear pins 31 to which the outer ends of the toggle links are pivoted, the wedges and links having interfitting knuckles 32 at said pins.

The machine is operated as follows: With the platen 2 first retracted from the platen 3, as shown in Figs. 1 and 6, the ram 21 is advanced to the right. The ram will exert a thrust upon the joint of the toggle but the latter will be unable to expand owing to the fact that when the platen 2 is in a retracted position the wedges 22 will have their outer ends in engagement with the inner sides of the resistance rods 9, as shown in Fig. 2. Said rods will then obstruct outward movement of the wedges and the latter will prevent expansion of the toggle under the thrust of the ram. Consequently the toggle, the wedges and the platen will be advanced as a unit by the ram and at the same rate of speed as the ram, the outer ends of the wedges sliding along the flat smooth inner faces of the resistance rods. When, however, the wedges reach a position opposite the recesses 13 of the rods 9, said recesses afford clearance for outward advance of the wedges. This occurs before the die D is brought into contact with the die D'. The wedges being thus freed from restraint, the ram is enabled to advance relatively to the platen 2, expand the toggle and project the wedges into the rod recesses 13 to bring their wedge surfaces 25 into engagement with the rod shoulders 14. Wedging coaction of surfaces 25 and 14 completes the advance of the platen 2 and causes the die D to be brought against the die D' to close the mold. Further advance of the ram causes further advance of the wedges to squeeze the dies together and lock them. It will be observed that the major portion of the advance of the platen is at the same rate as the advance of the ram while the final portion by the action of the wedges is much slower. Thereby shock, noise and possible injury to the dies is avoided as they come together.

Having so closed and locked the dies the plunger 6 is operated to force a melted charge of the material from the cylinder 5 through the nozzle 7 and the mold gate 8 and into the closed mold defined by the dies. Then after a suitable interval the ram 21 is retracted. The first result will be to break the toggle and withdraw the wedges from the recesses 13 of the strain rods and then retract the toggle, the wedges, the platen 2 and the die D as a unit and at the same rate as the ram.

The present invention provides means to facilitate accurate adjustment of the machine for proper locking coaction of the wedges 22 and the keeper abutments 14 on the resistance rods. The invention also provides means to ensure quick entry of the wedges into the recesses of the rods for engagement with the keeper abutments. This means will be first described. One of the wedges has a bore 33 extending longitudinally thereof from the inner end of the wedge and counterbored at its opposite end. A core pin 35 has a shank slidably fitted in said bore and heads 36 and 37 at opposite ends of said shank. Head 36 is adapted to bottom in the counterbore while the shank is of such length as to protrude from the bore and dispose the head 37 in a position spaced from the inner end of the wedge and protruding into a socket 38 in the opposed end of the other wedge when the toggle is broken or contracted as shown in Fig. 2. A compression spring 34 encircles the shank of the pin and thrusts against the inner end of the wedge and the head 37 to hold the latter projected into the socket 38 and against the bottom of the latter when the toggle is broken, as shown in Fig. 7. When the wedges have been advanced along the resistance rods to a point opposite the recesses 13 the spring will immediately project the wedges into the recesses. Further advance of the ram 21 and expansion of the toggle will further project and separate the wedges, and the head 37 will be withdrawn from the socket 38. Upon retraction of the ram to un-lock the mold and retract the platen, withdrawal of the wedges will project the head 37 again into the socket 38 and the spring will act as a buffer to prevent clashing of the opposite ends of the wedges.

For making castings of different sizes or shapes dies of different thickness between the platens must be employed. In order to accommodate the locking action to variations in die thickness the keeper abutments 14 must be adjusted toward or from the platen 3. This is accomplished by loosening the nuts 12 and adjusting the resistance rods 9 longitudinally. The adjustment of the keeper abutments should be such that when the dies are brought into contact with each other the wedge surfaces 25 will be in light contact with the keeper abutments 14 and the toggle should have capacity for still further expansion to further advance the wedges to squeeze and lock the dies together. In order to reserve a proper expansion capacity of the toggle for that purpose a gauge device is provided.

The gauge device includes a gauge block or plate 39 of approximately rectangular outline and with flat, parallel opposite faces. The block is disposed flat against a smooth rear face 40 of the platen 2 and with its major dimension vertical. The block is supported against the face 40 for vertical sliding adjustment. For such support of the block the flanges 17 of the bushings 16 have opposed parallel edges to fit the vertical edges of the block and said edges are undercut to provide them with ribs 41 overlapping the rear face of the block. Thereby the block is retained and guided for vertical sliding. The yoke 26 which is operatively connected to the joint of the toggle has its legs provided with projections 42 directed toward the gauge block and with their forward ends flat and in a vertical plane parallel to the plane of the block. The block has a pair of vertically spaced apertures 43 of a size to freely receive the projections 42. When the machine is in operation the gauge block is so adjusted as to dispose said apertures in horizontal alinement with the projections 42. For the said adjustment of the machine, however, the block is adjusted to dispose the apertures out of alinement with the projections 42 so that the latter will contact the block when the yoke is advanced.

For vertical adjustment of the gauge block there is a stem 44 anchored to the upper edge of the block at a central point of said edge, as at 45. Said stem is slidably fitted in a vertical bore 46 in a boss 47 formed on the upper end of the upper guide extension 27 on the platen 2. A cam 48 of approximately semi-circular contour is eccentrically pivoted to the upper end of the stem, as at 49, and bears against the upper end of the boss. The upper end portion of the stem is flattened and the cam is split to straddle said stem portion. The cam has a handle 50 for manually operating it. The throw of the cam and its connection with the gauge block are such that when the low point of the cam is in contact with the boss 47 the block will be disposed in a position to aline the apertures 43 with the yoke projections 42, and when the high point of the cam is in contact with the boss the block will be raised to a position wherein solid portions of the block, below said apertures, are alined with said projections. In order to retain the cam in its extreme adjustments it is preferably flatted at its high and low points.

For setting the machine to accommodate dies of a given thickness the cam is first operated to raise the gauge block 39 and dispose its apertures out of alinement with the yoke projections 42. Ram 21 is advanced to bring the die D into contact with die D' and the resistance rods 9 are adjusted longitudinally to enable the wedges to make light contact with the keeper abutments 14 on the rods. This light contact should occur when the yoke 26 has been advanced relatively to the platen 2 sufficiently to bring the projections 42 into contact with the gauge block. The gauge block then provides an obstruction to further advance of the yoke and further expansion of the toggle. The thickness of the gauge block is chosen to reserve for the toggle a proper degree of further expansion for adequate locking action when the machine is operated. Having properly adjusted the resistance rods they are locked in their adjustment by tightening the nuts 12, and the cam 48 is operated to lower the gauge block so that its apertures 43 will aline with the yoke projections 42. Thus the machine is conditioned for operation. In the operation of the machine the gauge block apertures afford clearance for further advance of the yoke and further expansion of the toggle to project the wedges sufficiently for the required die-locking action.

Features of the machine disclosed in this application but not claimed herein are claimed in the aforesaid copending application Serial No. 204,122.

What I claim is:

1. In a machine, the combination of an advanceable and retractible platen, locking means mounted on said platen for movement transversely of the direction of platen advance, a toggle mounted to travel with said platen and disposed at the rear thereof for movement of its joint toward and from the shiftable platen, means operatively connecting said locking means to said toggle to project the said locking means to operative position by expansion of the toggle by advance of its joint forward toward said platen, keeper abutment means adjustable along the line of platen advance and engageable by said locking means to lock the platen against retraction, gauge means comprising a gauge block located between a rear face of the platen and the toggle joint, guide means borne by the platen and supporting said block for sliding transversely of said line of advance into and out of an operative position, and stop means connected to the toggle joint and advanceable therewith to engage said block when the latter is in operative position, for limiting expansion of the toggle to hold said locking means in a position to determine adjustment of the abutment means into proper initial relation to the locking means for coaction therewith in subsequent operation of the machine, said block being formed and arranged to afford clearance when in inoperative position for further advance of the toggle joint to project the locking means.

2. In a machine, the combination of an advanceable and retractible platen, locking means mounted on said platen for movement transversely of the direction of platen advance, a toggle mounted to travel with said platen and disposed at the rear thereof for movement of its joint toward and from the shiftable platen, means operatively connecting said locking means to said toggle to project the said locking means to operative position by expansion of the toggle by advance of its joint forward toward said platen, keeper abutment means adjustable along the line of platen advance and engageable by said locking means to lock the platen against retraction, gauge means comprising a gauge block located between a rear face of the platen and the toggle joint, means supporting said block upon the platen for movement, in a plane transverse to the said line of advance, into and out of operative position, and stop means connected to the toggle joint and advanceable therewith to engage said block when the latter is in operative position, for limiting expansion of the toggle to hold said locking means in a position to determine adjustment of the abutment means into proper initial relation to the locking means for coaction therewith in subsequent operation of the machine, said block being formed and arranged to afford clearance when in inoperative position for further advance of the toggle joint to project the locking means.

3. In a machine, the combination of an advanceable and retractible platen, locking means mounted on said platen for movement transversely of the direction of platen advance, a toggle mounted to travel with said platen and disposed at the rear thereof for movement of its joint toward and from the shiftable platen, means operatively connecting said locking means to said toggle to project the said locking means to operative position by expansion of the toggle by advance of its joint forward toward said platen, keeper abutment means adjustable along the line of platen advance and engageable by said locking means to lock the platen against retraction, gauge means comprising a gauge block located between a rear face of the platen and the toggle joint, guide means borne by the platen and supporting said block for sliding transversely of said line of advance into and out of an operative position, stop means connected to the toggle joint and advanceable therewith to engage said block when the latter is in operative position, for limiting expansion of the toggle to hold said locking means in a position to determine adjustment of the abutment means into proper initial relation to the locking means for coaction therewith in subsequent operation of the machine, said block being formed and arranged to afford clearance when in inoperative position for further advance of the toggle joint to project the locking means, and an operating member for said block pivotally mounted upon said platen and manually operable for shifting the block between its operative and inoperative positions.

4. In a machine, the combination of an advanceable and retractible platen, locking means mounted on said platen for movement transversely of the direction of platen advance, a toggle mounted to travel with said platen and disposed at the rear thereof for movement of its joint toward and from the shiftable platen, means operatively connecting said locking means to said toggle to project the said locking means to operative position by expansion of the toggle by advance of its joint forward toward said platen, keeper abutment means adjustable along the line of platen advance and engageable by said locking means to lock the platen against retraction, shiftable gauge means, means supporting said gauge means between the rear face of the platen and the toggle joint for shifting movement from inoperative position into operative position between the rear face of the platen and the toggle joint, and stop means connected to the toggle joint and advanceable therewith to engage said gauge means when the latter is in operative position, for limiting expansion of the toggle to hold said locking means in a position to determine adjustment of the abutment means into proper initial relation to the locking means for co-action therewith in subsequent operations of the machine.

5. In a machine, the combination of an advanceable and retractible platen, locking means mounted on said platen for movement transversely of the direction of platen advance, a toggle mounted to travel with said platen and disposed at the rear thereof for movement of its joint toward and from the shiftable platen, means operatively connecting said locking means to said toggle to project the said locking means to operative position by expansion of the toggle by advance of its joint forward toward said platen, keeper abutment means adjustable along the line of platen advance and engageable by said locking means to lock the platen against retraction, shiftable gauge means movable into operative position between the platen and the toggle for limiting the expansion of the toggle to hold said locking means in a position to determine adjustment of the abutment means into proper initial relation to the locking means for co-action therewith in subsequent operations of the machine.

RICHARD W. DINZL.